United States Patent

[11] 3,592,297

| [72] | Inventor | Charles B. Leffert<br>Troy, Mich. |
|---|---|---|
| [21] | Appl. No. | 838,518 |
| [22] | Filed | July 2, 1969 |
| [45] | Patented | July 13, 1971 |
| [73] | Assignee | General Motors Corporation<br>Detroit, Mich. |

[54] DISC BRAKE COOLING
5 Claims, 2 Drawing Figs.

[52] U.S. Cl............................................. 188/71.6,
188/73.1, 188/250 B, 188/264 CC, 192/113 B
[51] Int. Cl....................................................... F16d 65/84
[50] Field of Search........................................... 188/71.6,
264 CC, 264.2, 250 B, 73.1; 192/113.2; 165/105

[56] References Cited
UNITED STATES PATENTS

| 3,208,559 | 9/1965 | Chambers et al. | 188/264 (CC) |
| 2,821,271 | 1/1958 | Sanford | 188/264 (.2) |
| 3,277,985 | 10/1966 | Caskey | 188/250 (B) X |
| 3,459,284 | 8/1969 | Wray | 188/264 (CC) |
| 3,481,439 | 12/1969 | Finkin | 188/264 (CC) X |

*Primary Examiner*—George E. A. Halvosa
*Attorneys*—W. E. Finken and D. D. McGraw ABSTRACT: A disc brake cooling arrangement in which the rotating brake disc friction surfaces are in heat transfer contact with the evaporator section of a heat pipe arrangement. The heat transferred during low levels of braking is transmitted to ambient air or other heat exchange means by conduction and convection. When sufficiently severe braking loads occur so that the conduction mode of heat transfer will not carry away the heat at a sufficient rate, the heat pipe liquid is vaporized and builds up vapor pressure to bring the heat pipe into efficient operation. As the cooling system quickly shifts into this mode of operation the entire heat pipe assembly in effect suddenly increases its thermal conductivity by several orders of magnitude and the heat is rapidly carried away to the heat pipe condenser section, where it is then removed by a suitable heat exchanger arrangement. The heat pipe assembly is provided as a part of each disc brake pad assembly, and is replaceable with the pad.

INVENTOR.
Charles B. Leffert
BY
D. D. McGraw
ATTORNEY

DISC BRAKE COOLING

The invention relates to cooling automobile disc brakes utilizing friction to absorb kinetic energy by converting the energy to heat, and more particularly to an arrangement wherein the increased thermal conductivity of a heat pipe at heavy heat loads maintains the rate of heat removal at a sufficiently high level to dissipate the heat generated without adversely affecting the brakes.

In order to brake a vehicle such as an automobile or truck moving horizontally, the kinetic energy of the entire mass of the vehicle must be converted to heat. There is some energy conversion by aerodynamic drag on the vehicle, engine compression, fluid temperature in the transmission and rolling friction of the wheels relative to the road surface, for example. However, the primary mechanism of conversion of this energy to heat is the vehicle brake system. Heat generation rates vary greatly in vehicle brake systems and adequate provision must be made for the dissipation of high heat loads in a short period of time. The problem of removal of heat has been attacked by providing heat sinks, air cooling and liquid cooling. In the invention now disclosed and claimed, the heat transport device referred to in the art as a "thermocon" or a "heat pipe" is utilized. The heat is removed from the interfacial sliding surfaces of the rotating disc of the typical production disc brake. The disc is a fairly massive heat sink, is engaged at a relatively small arcuate portion of its annular braking surface by the brake pads, and has a major portion of the disc friction surfaces cooled by convection currents of air so that its average temperature increases rather slowly. The brake pad usually has little or no heat sink capability so that most of the heat generated at the interfacial surfaces passes directly into the disc.

Under rapid deceleration approaching 1 g, the typical automobile weighing about 3,600 pounds will transfer a power input into the discs which can heat the surface metal of the disc to high temperatures in the 1,000° F. range. Much of the heat in the disc is only temporarily stored in the surface layer of the metal, and as soon as the disc surface moves free of the brake pad the temperature gradient reverses near the disc surface and heat flows to the air until that part of the surface again engages the brake pad.

A device earlier known as the "thermocon," and now more commonly known as a "heat pipe," provides a more efficient transport of thermal energy than does ordinary conduction or convection. The device makes use of the high latent heat of vaporization of certain liquids and the high mass transport rates of the vapor phase to transport heat rapidly over appreciable distances with negligible temperature drops. The vapor is condensed, releasing the heat of vaporization, and returns by capillary action to the evaporator section of the heat pipe. A suitable wick material is provided to permit this operation. Heat pipe using various liquids such as ammonia, water, cesium, potassium sodium and lithium, have been built to operate at temperatures from the cryogenic regions to 2,000°C.

For efficient operation, the vapor pressure in the heat pipe must be sufficient to carry the heat load, but must also be within the pressure limits of the tube wall. The vapor pressure of a liquid increases rapidly with temperature and with an excess of liquid available for vaporization in the tube, extreme pressures can be generated if the temperature of the entire pipe becomes too high. Because of these limitations, the temperature range for efficient operation of any particular heat pipe is limited to a small range about the boiling point of the liquid at atmospheric pressure. Since it is generally desirable to keep brake lining temperatures at a level well below that at which brake fade may occur, it is desirable to use a heat pipe fluid with a boiling point near the desired brake lining temperature operating limit. This may be about 350°F., for example.

The prior art indicating the early developments of the thermocon or heat pipe includes the following U.S. Pat. issued on the dates noted to Richard S. Gaugler: Nos. 2,350,347, issued June 6, 1944; 2,350,348, issued June 6, 1944; 2,422,401, issued June 17, 1947; 2,448,261, issued Aug. 31, 1948; 2,466,541, issued Apr. 5, 1949; 2,514,572, issued July 11, 1950; 2,517,654, issued Aug. 8, 1950; 2,565,220, issued Aug. 21, 1951; 2,565,221, issued Aug. 21, 1951, 2,583,769, issued Jan. 29, 1952 and 2,702,460, issued Feb. 22, 1955.

Numerous articles have also been published on various facets of the heat pipe and for the purpose of illustrating the state of the art reference is hereby made to the article entitled "The Heat Pipe" by G. Yale Eastman, published in the May, 1968 issue of "Scientific American" beginning on page 38; and the article entitled "The Heat Pipe" published by Messrs. K. Thomas Feldman Jr. and Glen H Whiting in the Feb., 1967 issue of "Mechanical Engineering" beginning on page 30.

The invention involves a brake-cooling system in which the brake friction surfaces of the rotatable disc to be braked by a friction apply assembly has a brake-cooling arrangement incorporated with the friction apply assembly and including suitable heat dispersing means, a heat-conducting member receiving heat from the disc being braked, a heat pipe assembly in which the heat so received heats a liquid in the heat pipe and evaporates it, the vapor carrying the heat to a condenser section of the heat pipe where most of the heat is delivered to the heat dispersing means, and the condensed liquid is then returned through the heat pipe to again be heated to a state of vaporization, until the heat transferred from the rotating member is at sufficiently low rate to no longer vaporize the heat pipe liquid. The invention is embodied in an assembly including the disc brake pad and is readily removable and replaceable with the pad as a unit.

Figure 1:
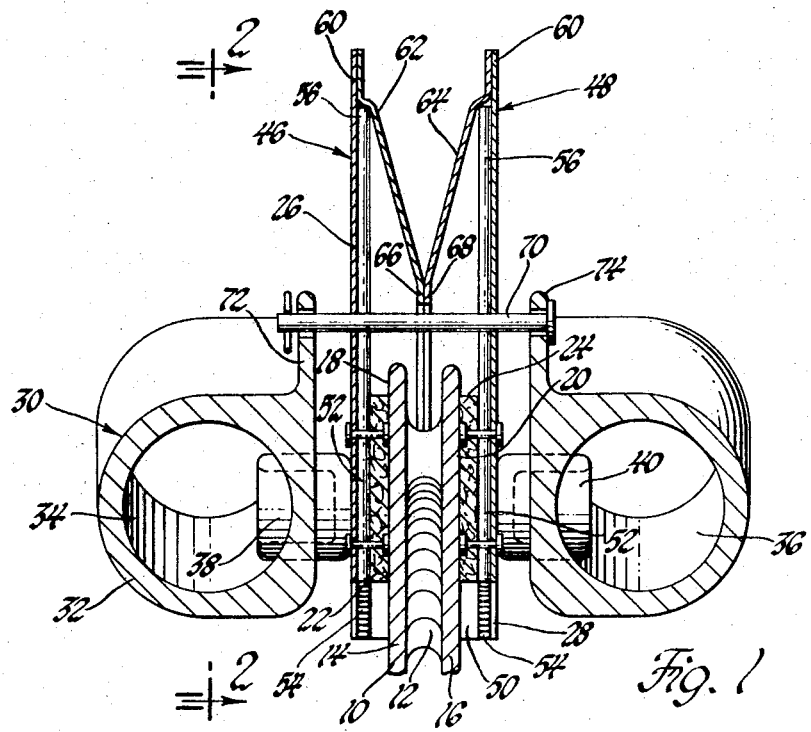
FIG. 1 is a cross section view of a portion of a disc brake assembly embodying the invention.

The disc 10 is illustrated as being of the vented type in which air passages 12 extend radially outwardly between the disc sides 14 and 16. Disc friction braking surfaces 18 and 20 are provided on the opposite sides of the disc and are engaged by the brake pads or linings 22 and 24, respectively, when the brake is energized. The brake pads are operatively secured to backing plates with pad 22 being operatively secured to backing plate 26, and brake pad 24 being operatively secured to backing plate 28. A caliper 30 is provided so that the brakes may be energized when desired. The caliper is illustrated as including a housing 32 extending in a looplike fashion about a chordal portion of the disc and having hydraulic pressurizing chambers 34 and 36 positioned on opposite sides of the disc. One or more pistons are actuated by hydraulic pressure in each hydraulic chamber. In the illustrated caliper, pistons 38 are actuated by pressurized brake fluid in chamber 34, and pistons 40 are actuated by pressurizing brake fluid in chamber 36. The hydraulic chambers are illustrated as being fluidly interconnected through the passages 42 and 44 formed in the disc crossover portions of a caliper housing. The caliper may be suitably mounted on a support mechanism. In some installations, a sliding caliper arrangement may be used instead of a fixed caliper.

The brake pad assembly 46, including backing plate 26 and brake pad 22, is similar to the opposite brake pad assembly 48, which includes backing plate 28 and brake pad 24. Therefore, like portions will be described for only one assembly, with similar reference numbers being used on both assemblies. Each brake pad assembly is provided with a high heat conductivity matrix 50 in which the evaporator sections 52 of the hat pipes 54 are imbedded. The matrix extends commensurate with the brake pad 24 and, in the preferred construction, is positioned between the brake pad 24 and the backing plate 28. Thus, the evaporator sections 52 of the heat pipes 54 receive heat conducted from the disc and the brake pad so that heat so received is capable of setting the heat pipes in operation under sufficient braking loads to generate heat at a sufficient rate to vaporize heat pipe fluid in the heat pipes. Also, in the preferred construction illustrated, the backing plates extend outwardly as do the heat pipes, with the backing plates forming framelike supports for the heat pipes, particularly at the heat pipe condenser sections 56.

Figure 2:
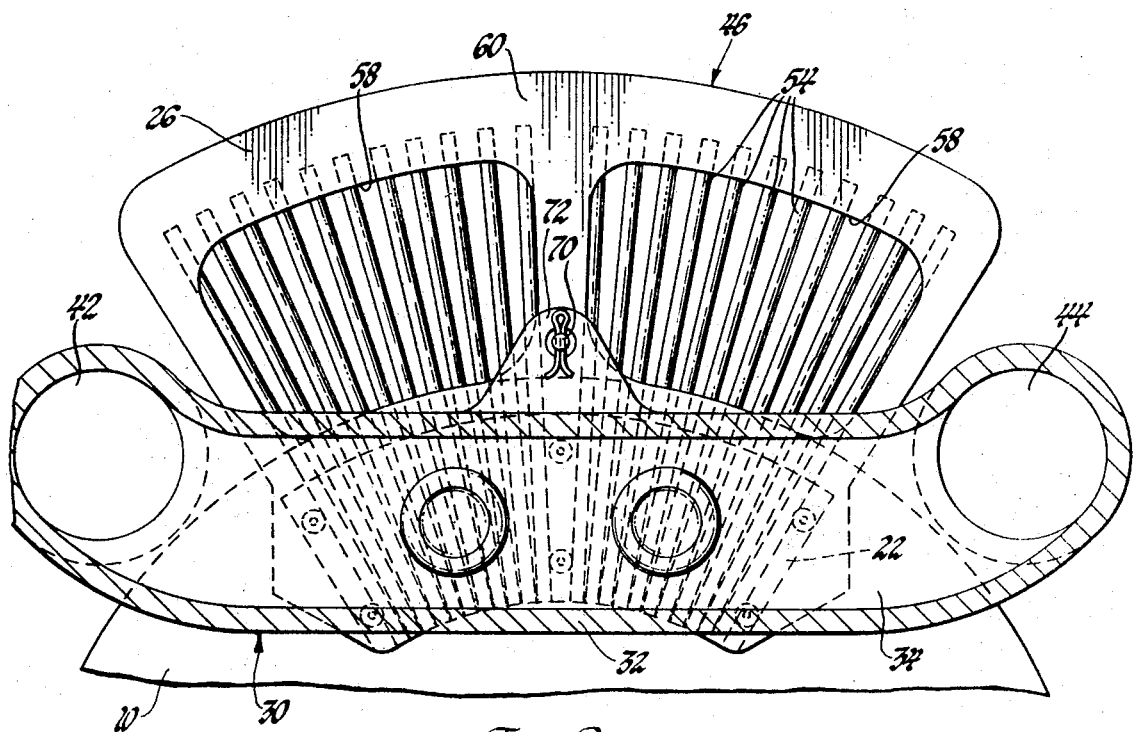
FIG. 2 is an elevation view taken in the direction of arrows 2-2 of FIG. 1, with parts being shown in section.

As can be better seen in FIG. 2, the backing plate 26 and the heat pipes 54 extend outwardly in a fanlike configuration. The backing plate 28 and its associated heat pipes 54 are similarly constructed. Each backing plate is preferably provided with vents or openings 58 permitting the flow of a suitable heat absorbing fluid such as air around the condenser sections of the heat pipes so that heat is readily removed therefrom and dispersed.

The outer perimeter 60 of each backing plate supports the outer ends of heat pipes 54 and also has secured thereto a deflector plate 62, with its outer periphery secured to the outer periphery of backing plate 26. Plate 62 is annular in form and somewhat dished so that its inner periphery 66 is positioned radially outwardly of the air passages 12 of vented disc 10. Deflector plate 64 is similarly constructed so that its inner periphery 68 closely approaches or engages the inner periphery 66 of deflector plate 62 when the assemblies are installed. Thus, the deflector plates direct the flow of heat absorbing air from the disc air passages 12 outwardly through the heat pipe condenser sections 56 and through the vents or openings 58.

The brake pad assemblies, including the cooling arrangements, are readily mounted and removed by use of a suitable mounting pin 70 extending through apertures formed in the backing plates 26 and 28 and through an aligned apertures formed in mounting ears 72 and 74, which are a part of the caliper housing 32. When pin 70 is removed, the brake pad assemblies may be moved radially outwardly and replaced. The removed pad assemblies may have new linings secured thereto and then be readily reused.

What I Claim is:

1. A disc brake pad assembly with a brake-cooling arrangement incorporated therein and comprising:
   a brake pad,
   a brake pad backing plate having said brake pad operatively secured thereto,
   a matrix operatively secured to said backing plate and having a plurality of heat pipes mounted therein and including portions extending therefrom,
   said heat pipes having evaporator sections and condenser sections and a suitable heat pipe fluid sealed therein, with said evaporator sections being in said matrix and receiving heat from said brake pad when said pad is braking a disc and said condenser sections being in said heat pipe extending portions,
   and means directing flow of a heat-absorbing fluid across said condenser sections to remove heat transported thereto by heat pipe operation.

2. The disc brake pad assembly of claim 1,
   said backing plate extending with said heat pipes and having portions providing a framelike support for said heat pipes and vents through which the flow of said heat-absorbing fluid is directed.

3. The disc brake pad assembly of claim 2,
   further comprising a deflector plate secured to an extended part of said backing plate and adapted to be in the airflow path of a ventilated disc with which the assembly may be used so as to deflect airflow from the disc in heat-absorbing relation with said heat pipe condenser sections, said heat-absorbing fluid being air.

4. The disc brake pad assembly of claim 2,
   said heat pipes being on the same side of said backing plate as said brake pad, said heat pipes and said backing plate extending outwardly in generally parallel relation to said brake pad.

5. The disc brake pad assembly of claim 4,
   said heat pipes extending outwardly in a fanlike configuration.